(12) United States Patent
Chen

(10) Patent No.: US 7,378,674 B2
(45) Date of Patent: May 27, 2008

(54) MAGNETIC VERIFICATION SYSTEM FOR BILL ACCEPTOR

(75) Inventor: Hung-Ta Chen, Hsintien (TW)

(73) Assignee: International Currency Technologies Corporation, Taipei (TW)

(*) Notice: Subject to any disclaimer, the term of this patent is extended or adjusted under 35 U.S.C. 154(b) by 1466 days.

(21) Appl. No.: 10/134,366

(22) Filed: Apr. 30, 2002

(65) Prior Publication Data

US 2003/0204471 A1 Oct. 30, 2003

(51) Int. Cl.
*G01J 1/32* (2006.01)
*B07C 5/344* (2006.01)

(52) U.S. Cl. ............... 250/556; 250/214 A; 209/569

(58) Field of Classification Search ............... 250/556, 250/214 A; 209/534, 567, 569
See application file for complete search history.

(56) References Cited

U.S. PATENT DOCUMENTS

| | | | | |
|---|---|---|---|---|
| 3,612,835 A | * | 10/1971 | Andrews et al. | 235/440 |
| 4,617,458 A | * | 10/1986 | Bryce | 235/449 |
| 5,693,931 A | * | 12/1997 | Wade | 250/205 |
| 6,049,478 A | * | 4/2000 | Walley et al. | 365/171 |
| 6,229,306 B1 | * | 5/2001 | Stein et al. | 324/243 |
| 6,639,200 B2 | * | 10/2003 | Chen | 250/205 |

* cited by examiner

*Primary Examiner*—John R. Lee
(74) *Attorney, Agent, or Firm*—Bacon & Thomas, PLLC

(57) ABSTRACT

A magnetic verification system for a bill acceptor includes a magnetic induction circuit, a signal amplifying and regulating circuit, and a magnetic field generating circuit. The signal amplifying and regulating circuit has a D/A converter, and the magnetic induction circuit has a magnetic device adapted for scanning the magnetic ink of the bill to be verified. The magnetic device is adapted to write a magnetic field reference value from the magnetic field generating circuit into the D/A converter, for enabling the D/A converter to adjust the intensity of light being emitted by a LED of the signal amplifying and regulating circuit onto a photoresistance of the signal amplifying and regulating circuit so as to cause the photoresistance to change the resistance thereof subject to the intensity of light from the LED, so that an operation amplifier at the output end of the magnetic induction circuit obtains the correct magnetic field signal value to verify the authenticity of the inserted bill.

11 Claims, 7 Drawing Sheets

US 7,378,674 B2

MAGNETIC VERIFICATION SYSTEM FOR BILL ACCEPTOR

BACKGROUND OF THE INVENTION

1. Field of the Invention

The present invention relates to bill acceptors and, more specifically, to a magnetic verification system for a bill acceptor in which the intensity of light emitted from an LED to a photoresistance is adjusted to cause the photoresistance to change its resistance so that the operational amplifier at the output end of a magnetic induction circuit obtains the correct magnetic field signal value to verify the authenticity of the inserted bill.

2. Description of the Related Art

The magnetic verification systems of regular bill acceptors are commonly adapted to verify the authenticity of bills by means of scanning the magnetic ink of the bills. When verifying different kinds of bills, the resistance value of a variable resistor is adjusted, thereby adjusting the gain of the operational amplifier connected to the variable resistor to produce a different amplification in response to different magnetic field signal values induced by the magnetic device of the system. However, when the ambient temperature changes significantly, the signal output of the magnetic device becomes unstable, and the weak output of voltage potential from the magnetic device, even after adjustment of the gain of the operational amplifier, is not stable enough for recognition, resulting in a false judgment. Further, different elements (magnetic device, operation amplifier) from different suppliers may be different in functioning, affecting the verification operation of the system.

SUMMARY OF THE INVENTION

The present invention has been accomplished to provide a magnetic verification system for a bill acceptor, which eliminates the aforesaid drawbacks. It is the main object of the present invention to provide a magnetic verification system, which automatically adjusts the induction signal subject to the type of bills to be verified. According to the present invention, the magnetic verification system comprises a magnetic induction circuit, a signal amplifying and regulating circuit, and a magnetic field generating circuit, the signal amplifying and regulating circuit and the magnetic field generating circuit being connected to a microprocessor, the signal amplifying and regulating circuit comprising a D/A (digital-to-analog) converter, the magnetic induction circuit comprising a magnetic device adapted for scanning the magnetic ink of the bill to be verified, the magnetic device being adapted to write a magnetic field reference value generated in response to scanning of a reference magnetic field generated by the magnetic field generating circuit into the D/A converter, for enabling the D/A converter to adjust the light intensity of light being emitted by an LED (light emitting diode) of the signal amplifying and regulating circuit onto a photoresistance of the signal amplifying and regulating circuit when the magnetic device has scanned the reference magnetic field, so as to cause the photoresistance to change the resistance thereof subject to the intensity of light from the LED, so that an operational amplifier at the output end of the magnetic induction circuit obtains, upon insertion of a bill to be verified, the correct magnetic field signal value to verify the authenticity of the inserted bill.

DETAILED DESCRIPTION OF THE PREFERRED EMBODIMENT

Figure 1:
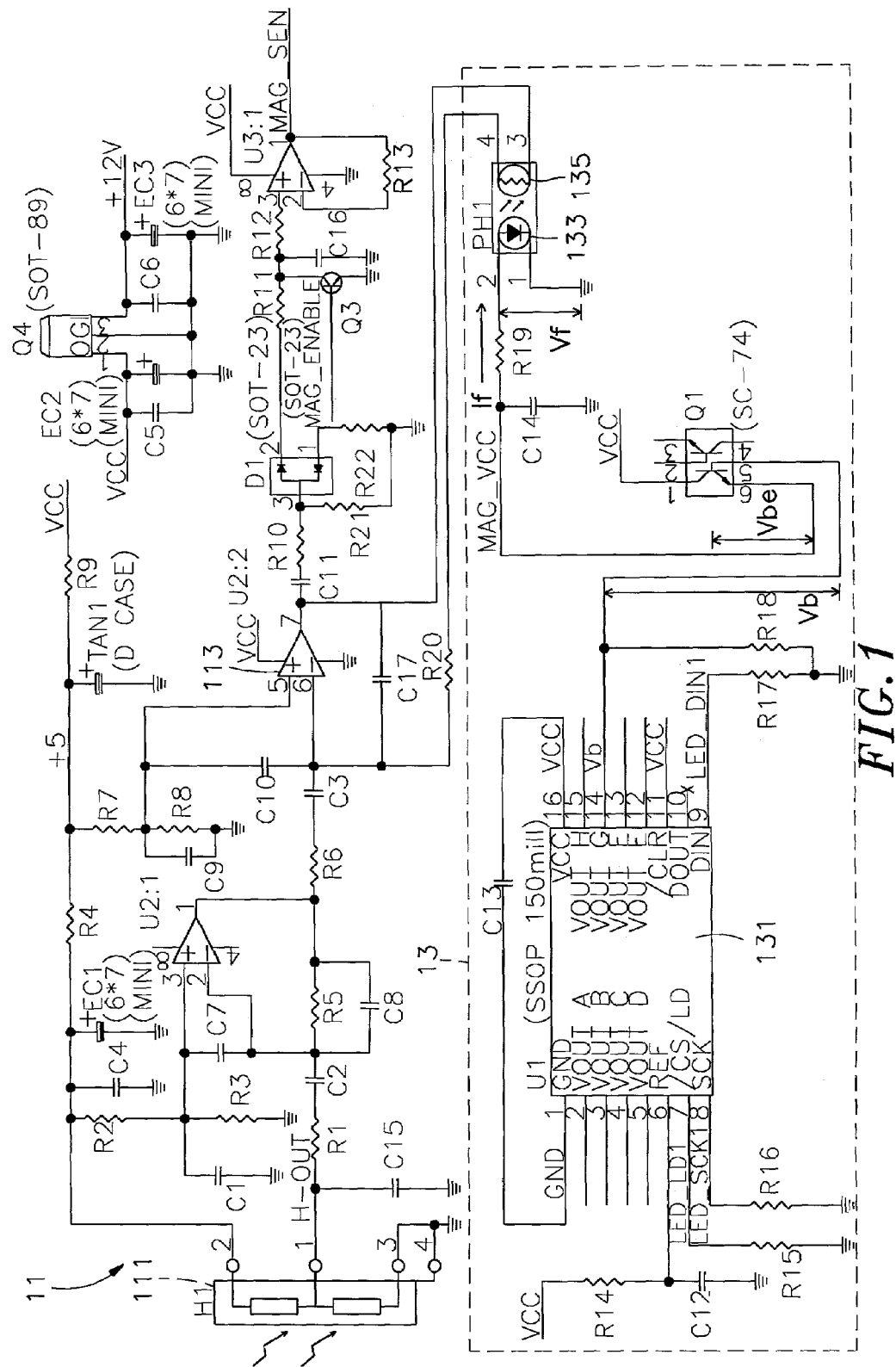
FIG. 1 is a circuit diagram of a magnetic induction circuit and a signal amplifying and regulating circuit for a magnetic verification system for a bill acceptor according to the present invention.
Figure 1A:
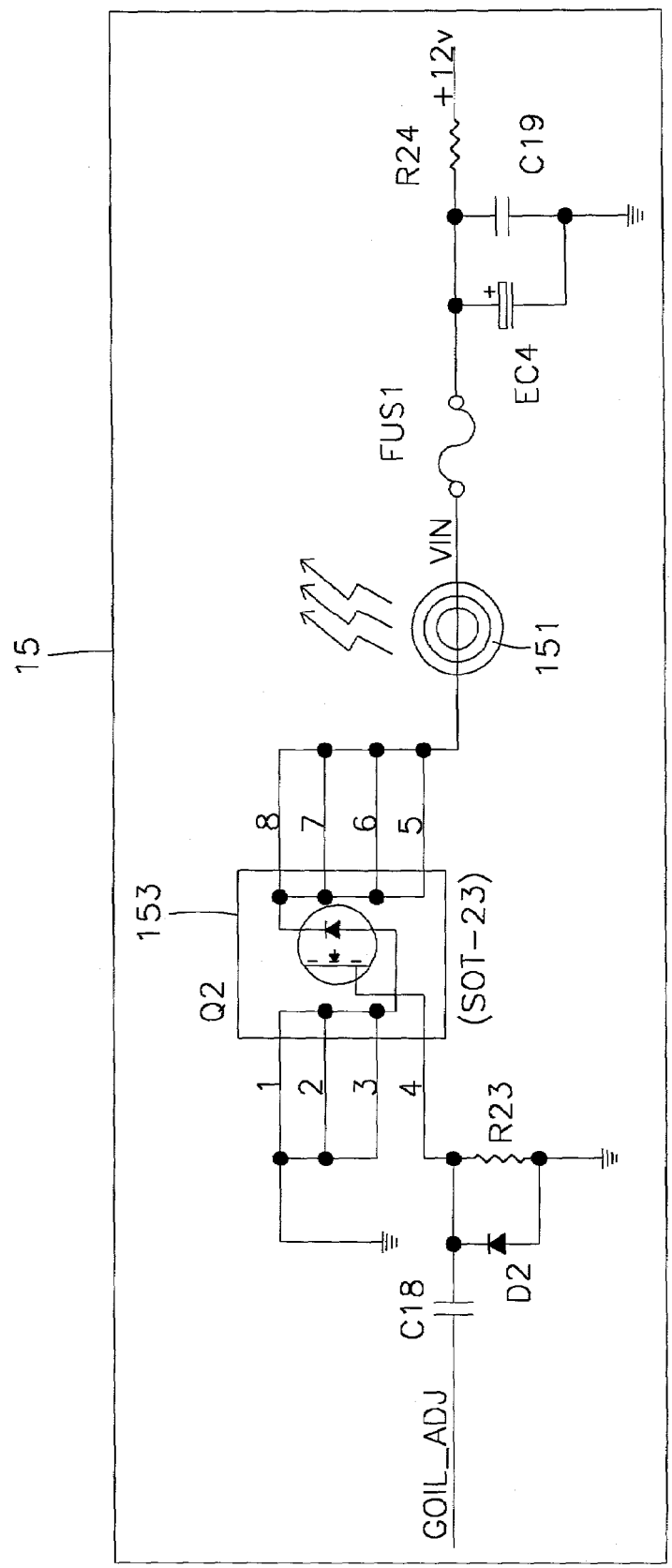
FIG. 1A is a circuit diagram of a magnetic field generating circuit for the magnetic verification system for a bill acceptor according to the present invention.
Figure 1B:
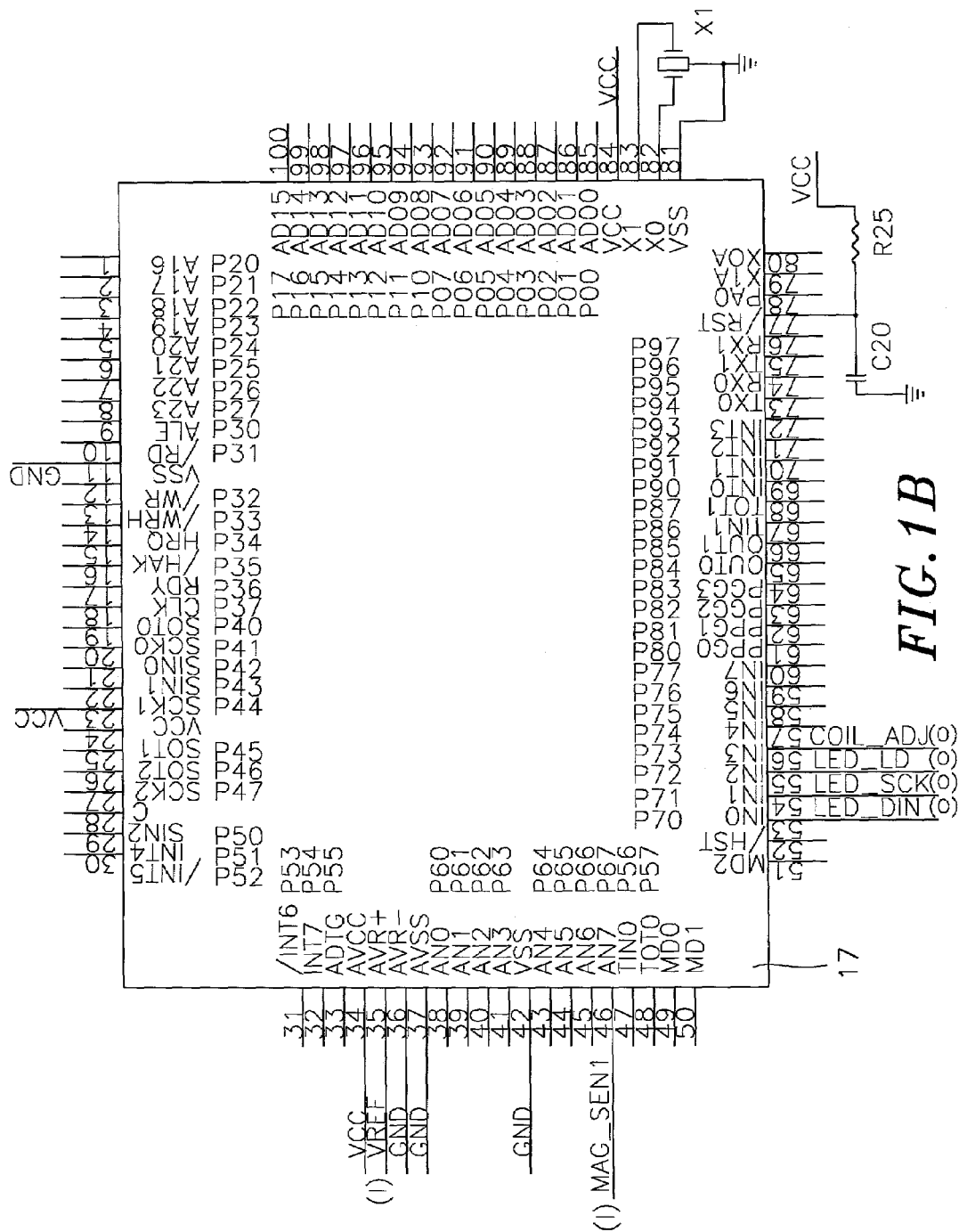
FIG. 1B is a circuit diagram of a microprocessor for the magnetic verification system for a bill acceptor according to the present invention.

Referring to FIGS. 1, 1A, and 1B, a magnetic verification system for a bill acceptor in accordance with the present invention is generally comprised of a magnetic induction circuit 11, a signal amplifying and regulating circuit 13, and a magnetic field generating circuit 15 for generating a reference magnetic field. The signal amplifying and regulating circuit 13 comprises a D/A (digital-to-analog) converter 131. The magnetic induction circuit 11 comprises a magnetic device 111 adapted to scan the magnetic ink of the bill to be verified for verifying the authenticity of the bill. Prior to accepting a bill, the magnetic field generating circuit 15 generates a reference magnetic field, which is scanned by the magnetic induction circuit 11 to generate a magnetic field reference value after which the magnetic device 111 immediately writes the magnetic field reference value into the D/A converter 131. The D/A converter 131 then adjusts the light intensity of an LED (light emitting diode) 133 of the signal amplifying and regulating circuit 13 being emitted onto a photoresistance 135, causing the photoresistance 135 to change its resistance subject to the intensity of light from the LED 133, so that when a bill is inserted and scanned, the operation amplifier 113 at the output end of the magnetic induction circuit 11 obtains the correct magnetic field signal value to verify the authenticity of the inserted bill.

The magnetic field generating circuit 15 comprises a magnetic pattern circuit 151, and an N-type semiconductor 153. The signal amplifying and regulating circuit 13 and the magnetic field generating circuit 15 are connected to the built-in microprocessor 17 or an external electronic device for setting, so that the user can control the microprocessor 17 or the external electronic device to set the type of the bill to be verified, enabling the microprocessor 17 or the external electronic device to provide a control signal to the D/A converter 131 of the signal amplifying and regulating circuit 13, or to transmit a corresponding pulse signal to the N-type semiconductor 153 of the magnetic field generating circuit 15 for causing the N-type semiconductor 153 to produce a switching effect and to generator an induction current, which causes the magnetic pattern circuit 151 to generate the above-mentioned reference magnetic field. When the magnetic device 111 detects the reference magnetic field generated by the magnetic pattern circuit 151, it immediately writes the magnetic field reference value into the microprocessor 17 or the external electronic device, causing the microprocessor 17 or the external electronic device to adjust the magnetic field signal value.

The aforesaid D/A converter 131 outputs a voltage Vb to the LED 133 subject to the pre-set reference value input by the user to the microprocessor 17 or the external electronic device. The voltage Vb is transmitted through a transistor Q1, and then shunted by the LED 133 to produce an electric current If for running the LED 133. This electric current If=(voltage Vb-shunt voltage Vbe of transistor Q1-shunt voltage Vf of LED 133)/resistance value of resistor R19. The D/A converter 131 produces different electric currents If to automatically regulate the intensity of light of the LED 133 subject to different magnetic field reference values.

The aforesaid D/A converter 131 is a micropower 8-bit DAC comprising 8 independent channel outputs VoutA~VoutH, a common reference voltage Vref (REF) at pin 6, and continuous input data DIN at pin 9. /CS/LD is a serial interface. When /CS/LD is at low potential, pin SCK is enabled to transfer DIN data to a register. DIN is comprised of 4-bit DAC address code A3~A0, 8-bit data code D7~D0, and 4-bit data code. After this 16-bit data code has been completely shifted, /CS/LD is pulled to high potential, and this 16-bit data code logs in data from the DAC register. When /CS/LD is at high potential, SCK is disabled, data is transferred from the shifting register to the DAC register, and at the same time Vout is renewed. The SCK is changed to low potential before drawing /CS/LD to low potential.

Further, when the intensity of the light from the LED 133 to the photoresistance 135 changes, the resistance value of the photoresistance 135 is inversely proportionally changed. This variation provides a feedback resistance to the operational amplifier 113, causing the operation amplifier 113 to make a proper gain adjustment.

Consequently, when verifying the authenticity of the inserted bill, the magnetic ink of the bill is moved over the magnetic device 111, enabling the magnetic device 111 to induce a stable magnetic signal value of the bill.

Figure 2:
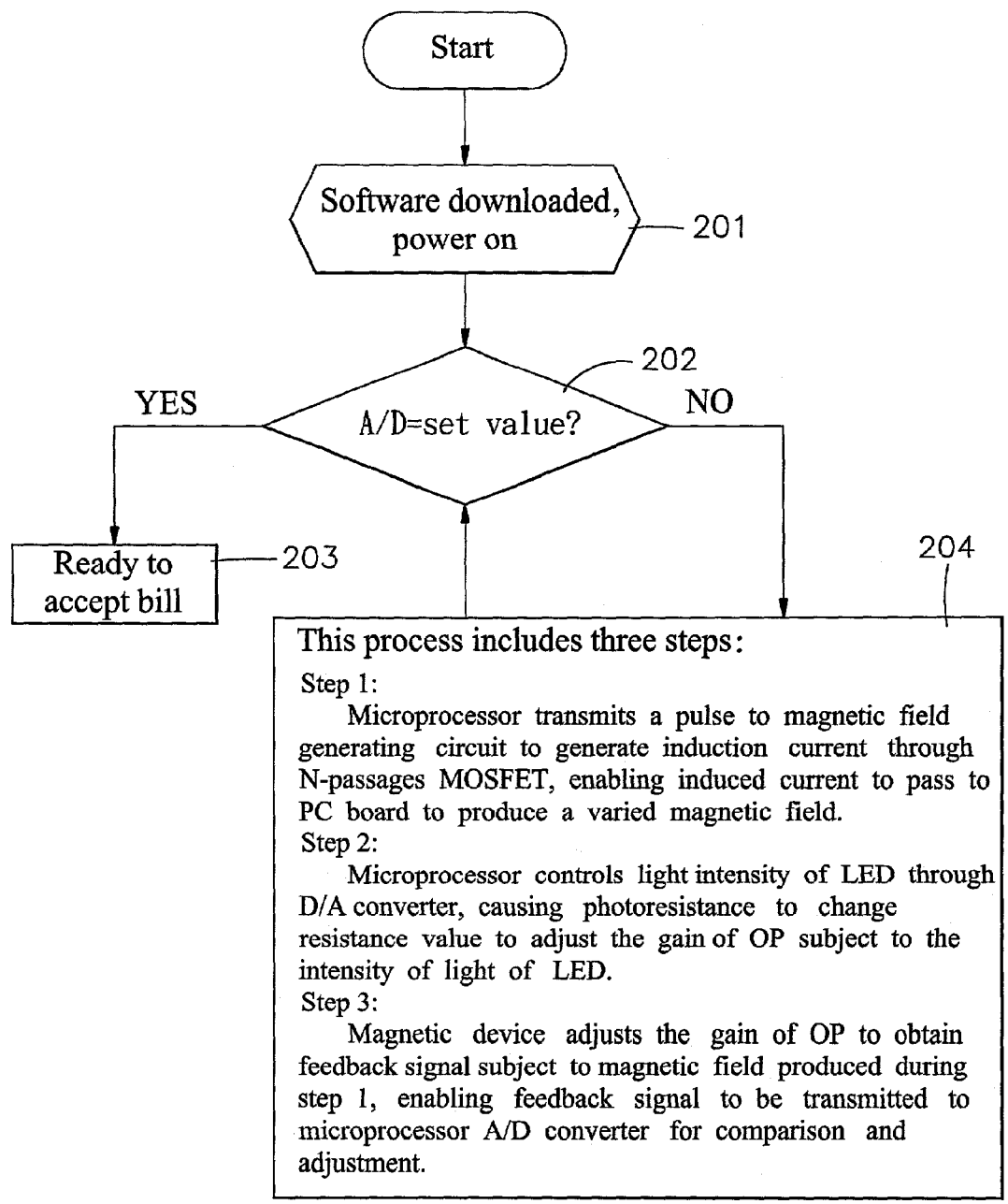
FIG. 2 is a flowchart showing the magnetic field reference value setting procedure according to the present invention.

Referring to FIG. 2 and FIGS. 1, 1A, and 1B again, when the signal amplifying and regulating circuit 13 runs a magnetic field reference value setting action, the microprocessor 17 or the external electronic device runs the following steps:

201 start bootstrap downloading to power-on the system, and then fetch the magnetic field reference value inputted by the user subject to the kind of bill to be verified;

202 judge if the magnetic field reference value generated by the induction circuit 11 in response to the reference magnetic field generated by the magnetic field generating circuit 15 and supplied to the microprocessor 17 is equal to the reference value set by the user, and then proceed to step 203 when yes, or step 204 when not;

203 The magnetic device 111 of the magnetic induction circuit 11 is ready to accept the bill, and at the same time the D/A converter 131 of the signal amplifying and regulating circuit 13 has adjusted the unstable error magnetic field signal value produced by the magnetic device 111 subject to the magnetic field reference value;

204 send a corresponding pulse signal to the N-type semiconductor 153 of the magnetic field generating circuit 15 subject to the magnetic field reference value inputted by the user, causing the N-type semiconductor 153 to produce a switching effect and to generate an induction current for causing the magnetic pattern circuit 151 to produce a magnetic field reference value for writing into the microprocessor by the magnetic device 111, so that the microprocessor 17 can adjust the unstable error magnetic field signal value produced by the magnetic device 111 subject to the magnetic field reference value through the D/A converter 131.

Figure 3:
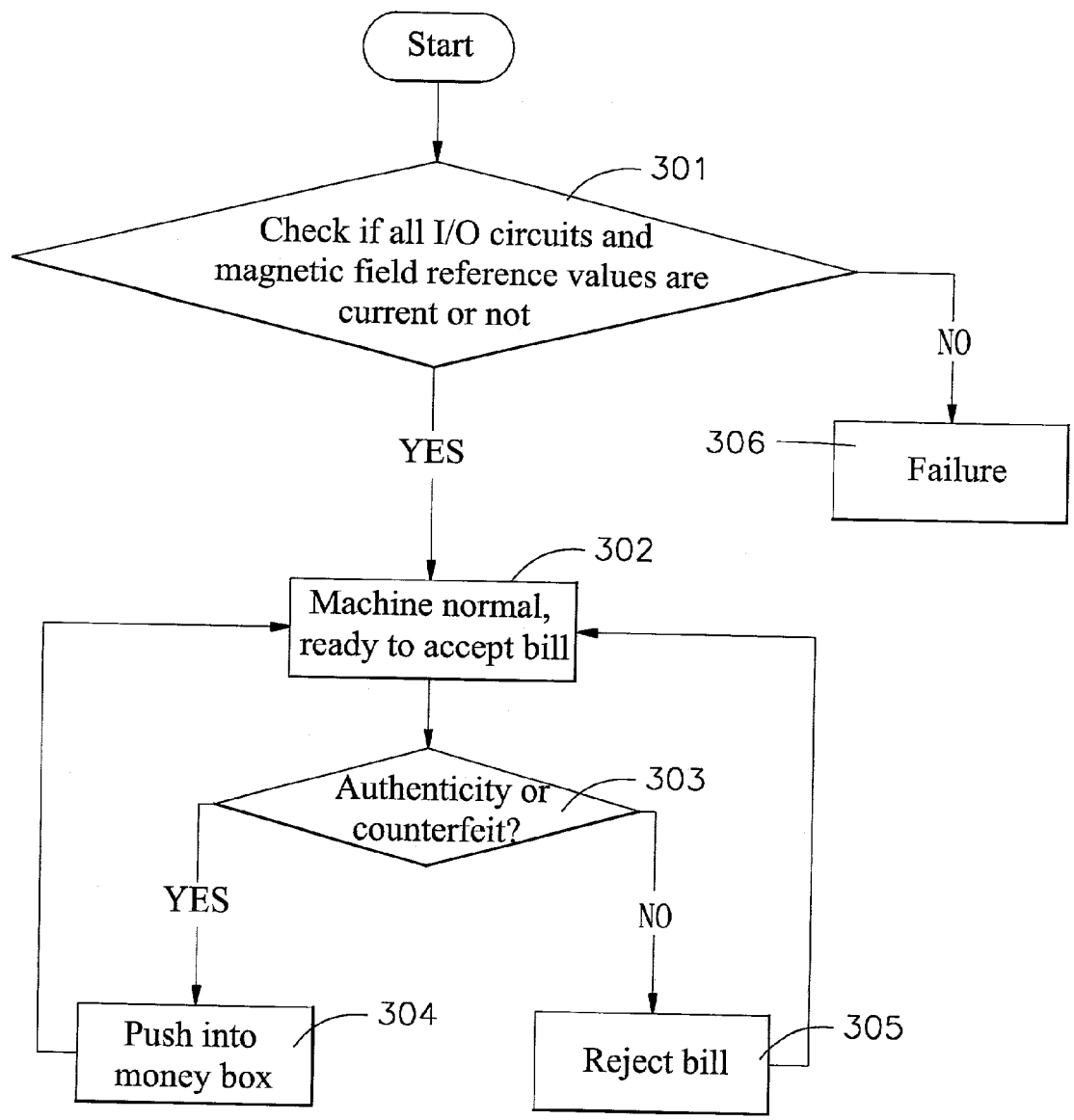
FIG. 3 is a flowchart showing the bill verification procedure according to the present invention.

Referring to FIG. 3 and FIGS. 1A and 1B again, when verifying the magnetic ink of the bill, the following steps are run:

301 the microprocessor 17 checks if all I/O circuits and magnetic field reference values are normal or not, and then proceeds to step 302 when yes, or step 306 when not;

302 be ready to accept bill;

303 judge if the bill is an authentic bill or not?, and then proceed to step 304 when yes, or step 305 when not;

304 push the authentic bill into a money box, and then proceed to step 302;

305 eject the counterfeit bill, and then proceed to step 302;

306 judge that it is a status of failure, and shut down for a repair work.

Thus, the invention eliminates the possibility of erroneously judging an authentic bill to be a counterfeit due to an unstable signal output of the magnetic device 111.

Figure 4:
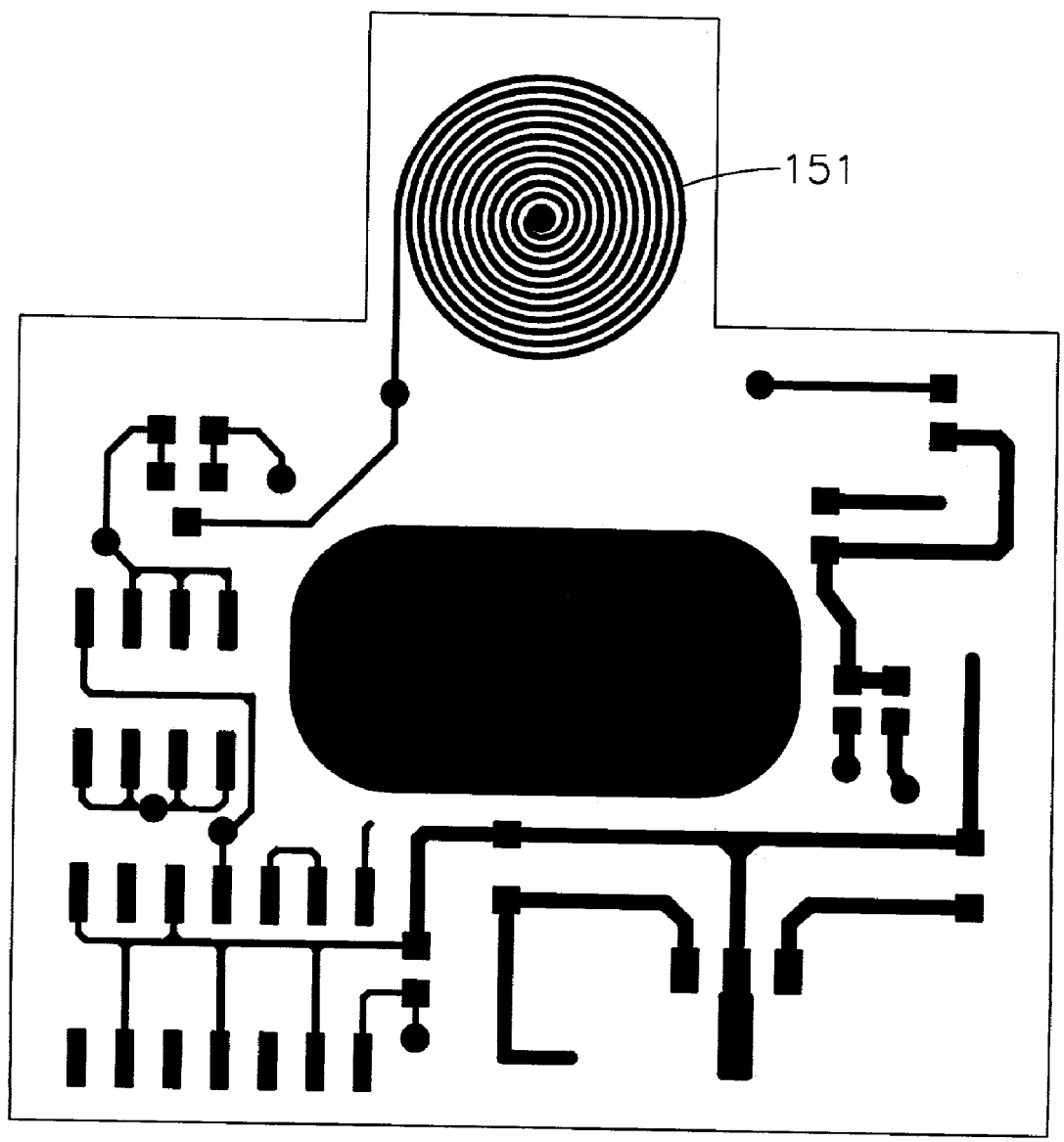
FIG. 4 is a schematic drawing showing one pattern of the magnetic pattern circuit according to the present invention.
Figure 5:
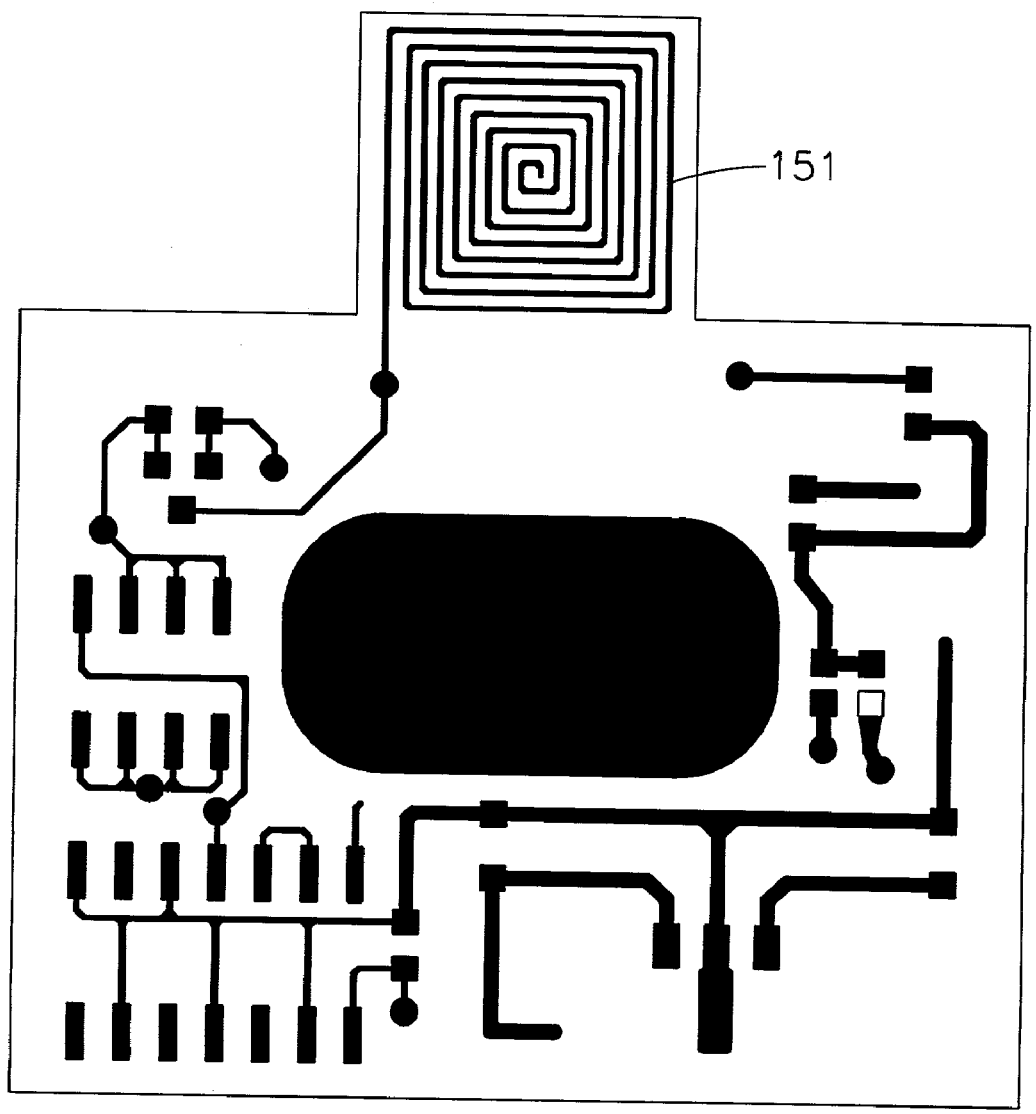
FIG. 5 is a schematic drawing showing another pattern of the magnetic pattern circuit according to the present invention.

Referring to FIGS. 4 and 5, the magnetic pattern circuit 151 can have the pattern of a rectangular winding or circular winding.

Further, the photoresistance 135 can be a transistor type photocoupler, MOS (metal oxide semiconductor) type photocoupler, FET (field effect transistor) type photocoupler, or the like. The magnetic device 111 can be a magnetic head, magnetic resistance element or coil, or the like.

A prototype of magnetic verification system has been constructed with the features of the annexed drawings of FIGS. 1~5. The magnetic verification system functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A magnetic verification system used in a bill acceptor and adapted for verifying the authenticity of the bill inserted into said bill acceptor, said magnetic verification system comprising:

a magnetic induction circuit, a signal amplifying and regulating circuit comprising a D/A (digital-to-analog) converter, and a magnetic field generating circuit for generating a reference magnetic field in response to a preset reference value input by a user, said reference magnetic field being sensed by said magnetic induction circuit to generate a magnetic field reference value, wherein said signal amplifying and regulating circuit and said magnetic field generating circuit are connected to a microprocessor, wherein said signal amplifying and regulating circuit comprises a D/A (digital-to-analog) converter, wherein said magnetic induction circuit comprises a magnetic device adapted for scanning the magnetic ink of the bill to be verified and to output a magnetic field signal value, and wherein said magnetic induction circuit is adapted to write the magnetic field reference value generated in response to said reference magnetic field generated by said magnetic field generating circuit into said D/A converter, for enabling said D/A converter to adjust the light intensity of light being emitted by a LED (light emitting diode) of said signal amplifying and regulating circuit onto a photoresistance of said signal amplifying and regulating circuit when said magnetic device has scanned said reference magnetic field, so as to cause said photoresistance to change the resistance thereof subject to the intensity of light from said LED, an so that an operational amplifier at an output end of said magnetic induction circuit obtains a correct magnetic field signal value after scanning an inserted bill to verify the authenticity of the inserted bill.

2. The magnetic verification system as claimed in claim 1, wherein said magnetic field generating circuit comprises a magnetic pattern circuit, and an N-type semiconductor, said magnetic field generating circuit being connected to said microprocessor for enabling the user to control said microprocessor to set the type of the bills to be verified and to simultaneously drive said microprocessor to transmit a corresponding pulse signal to said N-type semiconductor of said magnetic field generating circuit for causing said N-type semiconductor to produce a switching effect and to generate an induction current, which causes said magnetic pattern circuit to generate a magnetic field reference value for writing into said D/A converter by said magnetic device for adjusting the magnetic field signal value scanned by said magnetic device.

3. The magnetic verification system as claimed in claim 2, wherein said magnetic pattern circuit has a circular winding pattern.

4. The magnetic verification system as claimed in claim 2, wherein said magnetic pattern circuit has a rectangular winding pattern.

5. The magnetic verification system as claimed in claim 1, wherein said D/A converter outputs a voltage Vb to said LED subject to said magnetic field reference value, enabling said voltage Vb to be transmitted through a transistor Q1, and then shunted by said LED to produce an electric current If for running said LED, said electric current If=(voltage Vb-shunt voltage Vbe of transistor Q1-shunt voltage Vf of LED)/resistance value of resistor R19, said D/A converter producing different electric currents If to automatically regulate the intensity of light of said LED subject to different magnetic field reference values.

6. The magnetic verification system as claimed in claim 1, wherein when the intensity of the light from said LED to said photoresistance has changed, the resistance value of said photoresistance is inversely proportionally changed, and the variation provides a feedback resistance to said operational amplifier, causing said operational amplifier to make a corresponding gain adjustment.

7. The magnetic verification system as claimed in claim 1, wherein said photoresistance is a photocoupler comprising a transistor.

8. The magnetic verification system as claimed in claim 1, wherein said photoresistance is a photocoupler comprising an MOS (metal oxide semiconductor).

9. The magnetic verification system as claimed in claim 1, wherein said photoresistance is a photocoupler comprising an FET (field effect transistor).

10. The magnetic verification system as claimed in claim 1, wherein said magnetic device is a magnetic head.

11. The magnetic verification system as claimed in claim 1, wherein said magnetic device is a magnetic resistance element.

* * * * *